United States Patent
Schmitt et al.

(10) Patent No.: US 6,487,489 B2
(45) Date of Patent: Nov. 26, 2002

(54) METHOD AND ARRANGEMENT FOR CONTROLLING THE SPEED OF A VEHICLE

(75) Inventors: Johannes Schmitt, Markgroeningen (DE); Tobias Weiss, Gerlingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/819,979

(22) Filed: Mar. 29, 2001

(65) Prior Publication Data

US 2001/0044689 A1 Nov. 22, 2001

(30) Foreign Application Priority Data

Mar. 29, 2000 (DE) ......................................... 100 15 648

(51) Int. Cl.$^7$ .......................... F02D 41/14; F02D 35/00; B60K 31/04
(52) U.S. Cl. ............................ 701/93; 701/91; 123/333; 180/248
(58) Field of Search ............................ 701/110, 93, 91, 701/94, 74, 89, 70, 80; 123/333, 350, 397, 396, 359, 399, 339.21, 351; 180/248, 249; 303/163, 178, 144

(56) References Cited

U.S. PATENT DOCUMENTS

| | | | |
|---|---|---|---|
| 4,478,183 A | * 10/1984 | Misch et al. | 123/339 |
| 4,849,890 A | * 7/1989 | Inoue et al. | 364/426.02 |
| 4,884,203 A | 11/1989 | Preis et al. | 701/93 |
| 5,233,958 A | * 8/1993 | Knoss et al. | 123/396 |
| 5,405,183 A | * 4/1995 | Aizawa et al. | 303/103 |
| 5,558,178 A | 9/1996 | Hess et al. | 180/197 |
| 5,676,111 A | 10/1997 | Zhang | 123/325 |
| 5,803,197 A | * 9/1998 | Hara et al. | 180/248 |
| 5,854,989 A | 12/1998 | Speck et al. | 701/93 |
| 5,992,551 A | * 11/1999 | Frey et al. | 180/179 |
| 6,125,322 A | * 9/2000 | Bischof et al. | 701/114 |
| 6,202,021 B1 | * 3/2001 | Kresse et al. | 701/93 |
| 6,285,946 B1 | * 9/2001 | Steinmann | 701/110 |

* cited by examiner

Primary Examiner—Tan Nguyen
Assistant Examiner—Dalena Tran
(74) Attorney, Agent, or Firm—Walter Ottesen

(57) ABSTRACT

The invention is directed to a method and an arrangement for controlling the speed of a vehicle. The actual speed of the vehicle is determined and a desired speed and/or limit speed is pregiven. Furthermore, an engine drag torque controller and/or a drive slip controller are provided. The deviation between desired and/or limit and actual speed is supplied to at least one of these controllers. In the active speed control operation, at least one of these controllers influences an output quantity of the drive unit in dependence upon the speed deviation. In the active road speed limit operation, the drive slip controller influences an output quantity of the drive unit in dependence upon the speed deviation.

12 Claims, 3 Drawing Sheets

METHOD AND ARRANGEMENT FOR CONTROLLING THE SPEED OF A VEHICLE

BACKGROUND OF THE INVENTION

Modern vehicles are in many instances equipped with a driving speed controller with the aid of which the speed of the vehicle is controlled to a predetermined desired value pregiven by the driver. An example for a road speed controller is known from U.S. Pat. No. 4,884,203. Road speed controllers of this kind are complex and consume a certain portion of the available resources of a control apparatus (most of all of the computation time of the computer). The control apparatus is for controlling the drive unit of the vehicle. In some applications, the implementation of such a road speed controller can lead to problems.

The same applies also to road speed limiters which limit the speed of a vehicle to a maximum speed adjustable by the driver. An example for such a function is disclosed in U.S. Pat. No. 5,854,989.

A drive slip controller is known from German patent publication 197 34 112 wherein continuously the output torque is determined which is transmittable from the wheel to the roadway. If an instability occurs at least on one drive wheel of the vehicle, then the output quantity (preferably a desired torque value) of the drive slip controller, which is set to maximum value, is reset to a value corresponding to the maximum transmittable output torque. For a continuing slippage, this desired value is successively reduced and for lessening or vanishing drive slippage, the desired value is successively increased until the maximum value is again reached. If drive slip occurs anew, the desired value is set again to the quantity which represents the maximum transmittable value.

An engine drag slip control is disclosed in U.S. Pat. No. 5,676,111. There, a desired torque value is determined on the basis of the wheel behavior of at least one drive wheel and this desired torque value functions to adjust the drive unit. Here too, the desired value is successively increased when there is a tendency for blocking and for a lessening blocking or for a vanished tendency to block, the desired value is again reduced to the output value which is here preferably the value 0.

U.S. Pat. No. 5,558,178 discloses the determination of a driver desired torque on the basis of the accelerator pedal position and the engine rpm. A resulting desired torque is determined in the context of a maximum and minimum selection from this driver desired torque and the desired torque of the engine drag torque controller and the desired torque of the drive slip controller. The torque of the drive unit is adjusted in dependence upon this resulting desired torque.

SUMMARY OF THE INVENTION

The realization of a road speed limiter function (FGB) and/or a road speed controller function (FGR) via the control systems for the control of the drive slip or of the engine drag torque, which are anyway available, reduces the complexity of the software of the control unit of the drive unit because the complex road speed limiter (FGB) and/or road speed controller (FGR) can be omitted.

Notwithstanding the omission of a separate road speed limiter and/or road speed control function, a reliable, satisfactory limiting and/or control of the road speed of the vehicle is achieved.

Special advantages are presented when an additional road speed limiter control apparatus or road speed control apparatus is eliminated and thereby considerable costs are saved.

It is especially advantageous that the resource requirement, which is increased by a conventional complex road speed limiter and/or road speed controller, is omitted and the expansion of the resources is unnecessary which would be required for the use of such a function.

For a drive slip controller, which acts also on the wheel brakes, it is especially advantageous that a road speed limiter and/or road speed control with brake intervention is realized and/or with additional complexity and the speed limiting and/or speed control is improved in this manner.

It is further advantageous that, to realize the road speed limiter (FGB), one can make use of the function of the road speed controller (FGR) so that this additional function can be realized without additional complexity.

BRIEF DESCRIPTION OF THE DRAWINGS

The invention will now be described with reference to the drawings wherein.

Figure 2:
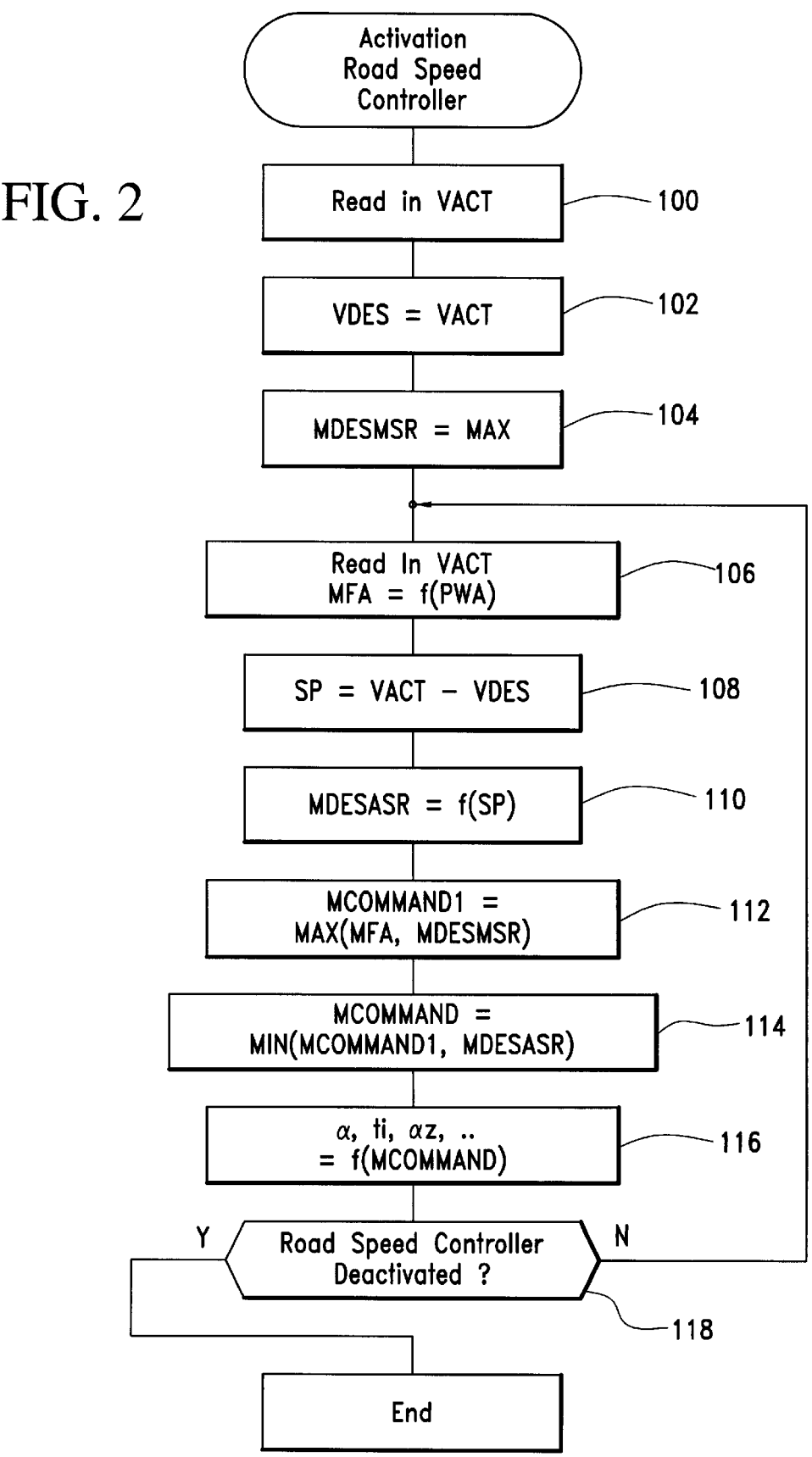
FIG. 2 is a preferred embodiment which shows the execution of a road speed control by means of a drive slip controller and an engine drag torque controller as a flow diagram; and, FIG. 3 shows the execution of a road speed limiting by means of a drive slip control as a flow diagram with respect to a preferred embodiment.
Figure 3:
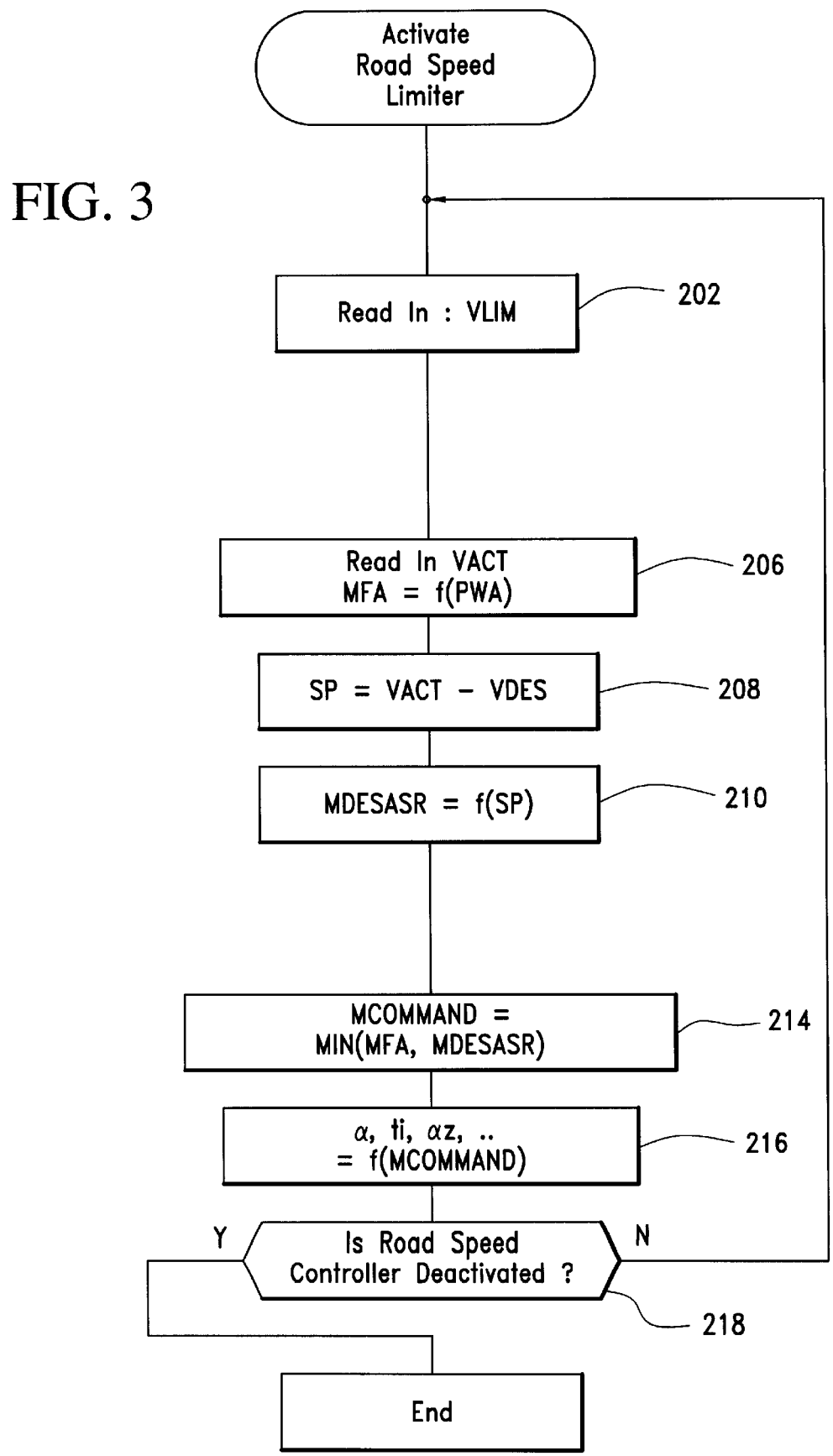

The flowcharts of FIGS. 2 and 3 outline programs which are executed in the microcomputer of the control unit for influencing the engine power or for influencing the brakes.

DESCRIPTION OF THE PREFERRED EMBODIMENTS OF THE INVENTION

Figure 1:
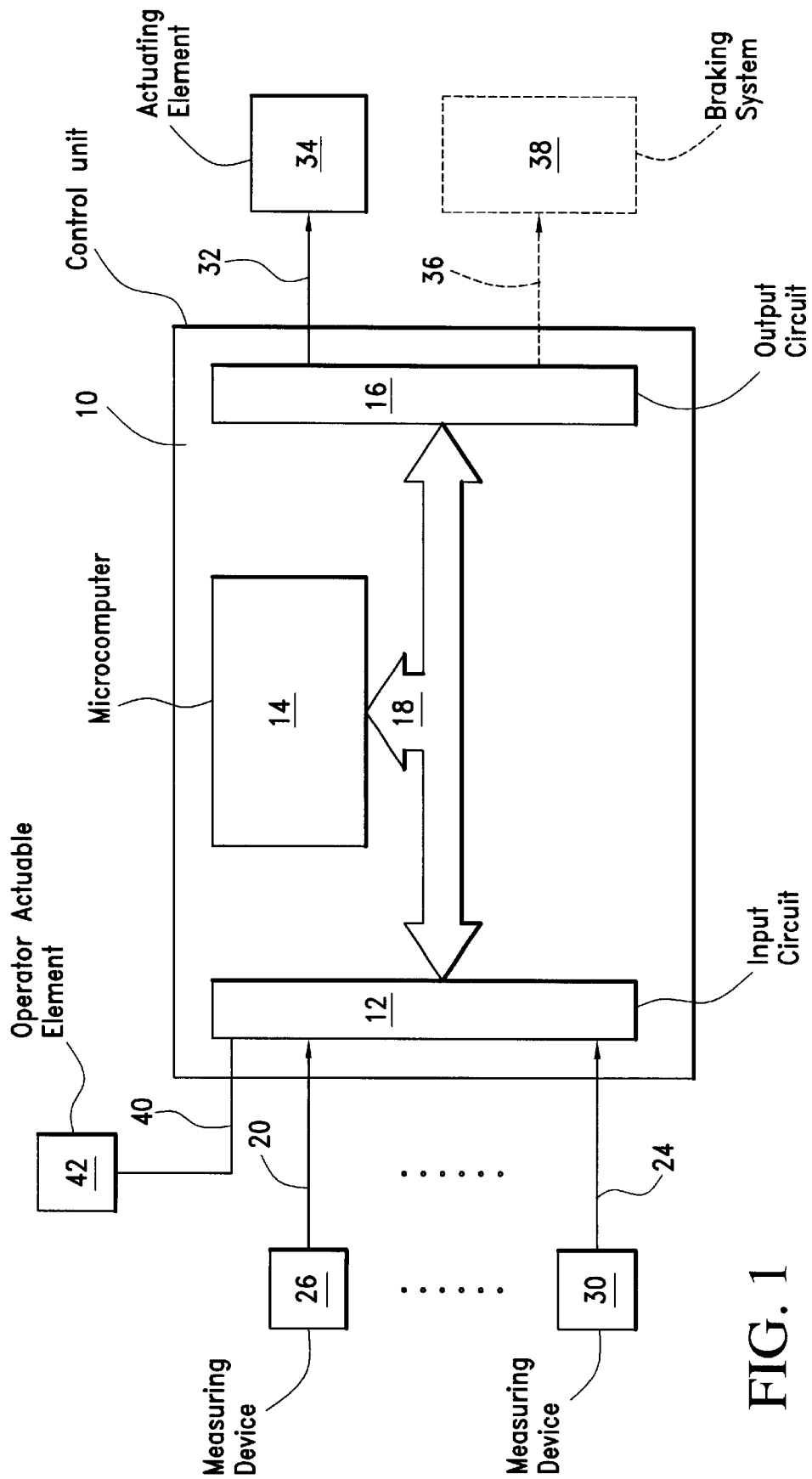
FIG. 1 is an overview block circuit diagram of a control arrangement for controlling a drive unit.

FIG. 1 shows a control unit 10 which includes at least one input circuit 12, at least one microcomputer 14 and at least one output circuit 16. These elements are connected to each other via a communications system 18 for the mutual exchange of data. Input lines are connected to the input circuit 12 via which signals are supplied which represent operating variables or from which operating quantities can be derived. In the following, primarily the wheel slip of at least one drive wheel and the road speed are determined and evaluated so that only input lines 20 to 24 are shown in FIG. 1 for reasons of clarity. The input lines 20 to 24 supply signals which represent the wheel speeds. These signals are determined in measuring devices 26 to 30.

In addition, and depending upon embodiments, additional quantities are supplied. An input line 40 is also shown, which connects the input circuit to an operator-controlled element 42, which is actuated by the driver, for adjusting the speed control mode and/or the road speed limiter mode. With respect to the road speed controller, this operator-controlled element has, for example, the conventional positions "out", "set", "accelerate", "decelerate", et cetera. In a limiter, the operator-controlled element allows the driver to also set a limiting value for the speed in addition to activating the limiter. In the preferred embodiment, the control unit 10 is the control unit for the internal combustion engine. For this reason, and as additional input quantities, signals are provided which represent the engine rpm, the engine load, the throttle flap angle, et cetera. The control unit 10 outputs actuating quantities in the context of the controls executed by the control unit 10. These actuating quantities are outputted via the output circuit 16 and the output lines connected thereto. At least one output line 32 leads to at least an actuating element 34 for influencing the power of the engine. In the preferred embodiment, the actuating element 34 is the throttle flap or the fuel feed of the engine which is actuated via the line 32 by a corresponding actuating quantity.

In other advantageous embodiments, the braking system 38 of the vehicle is actuated in the alternative or supplementary to intervene in the engine via the at least one output line 36. A braking force at at least one drive wheel is built up when drive slip is present.

In addition to the intervention possibilities described, other intervention possibilities are available depending upon the embodiment. For example, in one embodiment, and in addition or in the alternative to throttle flap influencing, an influencing of the ignition angle of the engine and/or the metering of fuel is executed in the sense of a suppression of injections. Furthermore, the possibility is present to shift the transmission, to open an electrically actuable clutch in the drive train of the vehicle when drive slip is present, et cetera.

In the drive slip control, as mentioned for example, in the state of the art initially referred to herein, the drive slip of at least one drive wheel is determined and, depending upon the magnitude of this drive slip, an intervention in the braking system of the vehicle and/or in the torque of the drive unit of the vehicle is undertaken in such a manner that, for a large slip, the drive slip is reduced and is preferably brought back to a pregiven value. Then, a successive reduction takes place as long as the slippage continues. Thereafter, the torque is again successively increased until a maximum value is reached. Under specific conditions (for example, slip magnitude), a braking intervention takes place in parallel thereto.

Furthermore, a so-called engine drag torque control is implemented in the computer unit of the control unit. The engine drag torque control determines the blocking tendencies of at least one drive wheel based on the wheel slip and pregiven threshold values and increases the engine torque when such a tendency to block is detected at at least one drive wheel. The control takes place in correspondence to the description with respect to the drive slip controller.

Furthermore, a driver command torque is formed to control the drive unit. This driver command torque is, for example, read out in accordance with a characteristic field on the basis of the accelerator pedal position and the engine rpm.

To control the drive unit, a resulting desired value is selected from the three supplied desired values and this resulting desired value is converted into actuating quantities while considering the operating state of the drive unit. These actuating quantities influence the torque of the drive unit. Such actuating quantities are, depending upon the configuration of the drive unit, the throttle flap position, fuel metering and ignition angle for spark-ignition engines, fuel mass for diesel engines or current quantities for electric motors. The selection of the resulting desired value takes place in the context of a coordination of the supplied desired quantities especially by means of maximum or minimum value selection stages. In the preferred embodiment, the larger is selected from the driver command torque and the desired torque of the engine drag torque controller and is outputted as a first desired torque. This first desired torque is then compared to the desired torque of the drive slip controller in the context of a minimum value selection and, as resulting desired torque, the smallest of the two values is selected. This resulting desired torque serves for adjusting the drive unit.

In another embodiment, no engine drag torque controller is utilized so that in the above description, the elements can be eliminated which serve to coordinate the engine drag torque controller.

The above logic is utilized in the realization of a drive speed controller (FGR) by means of the engine drag torque controller and the drive slip controller.

As in a conventional road speed controller, the driver has at least one operator-controlled element with the aid of which the road speed controller is activated. With the activation of the road speed controller, the drive speed desired value VDES is set to the actual measured road speed value VACT. This value VACT is either determined by means of a separate road speed transducer or on the basis of selected wheel speeds. If the road speed controller is activated, then, in a first embodiment, the desired value of the engine drag torque controller is manipulated in such a manner that is outputs a maximum value. The consequence would be, based on the above presented coordination, that an acceleration of the vehicle results when the desired torque value is greater than that pregiven by the driver. In order to ensure a drive speed control function for this embodiment, the desired torque of the engine drag torque controller must be so large in the road speed control mode that, as a rule, an acceleration of the vehicle results. With the resulting acceleration of the vehicle, a deviation arises between the desired and actual speeds. This deviation is now supplied as slippage to the drive slip controller which is in the drive speed control mode.

The drive speed controller reduces the drive torque based on the slip applied thereto until the slip is reduced. Accordingly, an equilibrium adjusts between the drive torque and the total running resistance. If the actual speed drops below the desired value, then the drive slip controller again increases the engine torque so that the vehicle again accelerates. In this way, the speed can be controlled to the desired value.

If, for example, the total running resistance changes, for example, when there is uphill travel or drops in the grade, or deep snow or gravel stretches of roadway, this likewise leads to a road speed deviation which leads to a change in slip. This change in slip is then controlled out by engine torque change as described above. For controlling out, the entire drive torque range as well as the decelerating drag torque range are available because the drive slip controller can take back the engine torque completely.

Should the manipulated maximum desired torque of the torque drag controller not lead to an acceleration, for example, because of a grade increase (that is, no deviation occurs between desired and actual speeds in the sense of an actual speed lying above the desired speed), then the speed difference is not interpreted as wheel slip and the drive slip controller remains inactive.

This solution is described as a flow diagram in FIG. 2 based on a preferred embodiment. The flow diagram outlines the program of the computer of the control unit.

The program shown is started when the driver activates the road speed controller by actuating the operator-controlled element. If this is the case, the program is executed in pregiven time intervals. After activating the road speed controller, the actual road speed VACT is read in in a first step 100. Thereafter, in step 102, the road speed desired value VDES is set to the actual value VACT and, in the next step 104, the desired value of the road speed controller MDESMSR is set to a maximum value MAX. Thereafter, in step 106, the actual road speed VACT is read in as well as the driver command (driver command torque MFA) formed on the basis of the accelerator pedal position in another program. Thereafter, in step 108, the pseudo slip value SP is determined as the difference of actual speed VACT and desired speed VDES. Thereafter, in step 110, the desired torque MDESASR is read in which is formed by the drive slip controller on the basis of the pseudo slip SP. As described above, this desired torque value is successively reduced by the drive slip controller until a positive slip is present. If this positive slip has vanished or is negative, the desired torque value MDESASR is successively increased until it reaches the maximum value. Thereafter, in step 112, the first desired torque MCOMMAND1 is determined as the maximum value from the accelerator command torque MFA and the desired torque of the engine drag torque control MDESMSR. As a rule, this is the maximum value of the desired torque value of the engine drag torque controller. In the next step 114, the command torque MCOMMAND is formed from the minimum value selection of the first command torque and the desired torque MDESASR.

In the next step 116, the resulting command torque MCOMMAND is applied to form at least one actuating quantity of the drive unit, for example, the throttle flap position, fuel mass, ignition angle, drive current, et cetera. In the next step 118, a check is made as to whether the road speed controller is deactivated. If this is not the case, the program is repeated with step 106 and ended with the deactivation of the road speed controller.

To improve the operation and the function comfort of the road speed controller, another embodiment provides that the road speed slip controller is only active when the actual speed increases beyond the desired speed by a certain amount or when the determined pseudo slip value exceeds a pregiven positive threshold value. This contributes to quieting the control function and improves driving comfort.

In the embodiment described, only the setting of the road speed controller to the actual speed value as desired value is described. In other embodiments, acceleration functions and deceleration functions are available in the described road speed controller which are known to persons of skill from the conventional road speed controllers.

To realize such a function, it is provided that, for a corresponding activation via the operator-controlled lever by the driver, a desired speed value is pregiven which changes as a function of time and which is derived from the road speed at the start of the activation. The desired value of the engine drag torque control is set to a maximum value. For this reason, an acceleration of the vehicle takes place as long as the actual speed is below the desired speed changing as a function of time. Only when the actual speed exceeds the desired speed, does a torque reduction take place via the drive slip controller. The result is therefore a control of the road speed along the desired speed which changes as a function of time. The same applies to the deceleration phase wherein a desired value, which reduces as a function of time, is pregiven and wherein a drive slip control intervention is undertaken as a consequence of the actual speed exceeding the desired value, as a rule. The drive slip control intervention leads to a changing reduction over time orientated on the desired value. In this way, the resumption of a stored speed is realized.

The conventional function scope of a drive speed controller can thereby likewise be realized via engine drag torque controller and drive slip controller.

In the embodiment described above, the desired torque value of the engine drag torque controller is set to a maximum value for road speed control and the road speed is maintained via a reducing intervention of the drive slip controller. In another embodiment, this is reversed. Accordingly, when activating the drive speed controller, the desired torque value of the drive slip controller is set to a minimum value, preferably 0. The speed deviation is then interpreted as pseudo slip for the engine drag controller. The engine drag torque controller then increases the torque in accordance with the deviation between the actual speed and the desired speed. As a consequence of exchanging the steps 112 and 114, the minimum value is first determined from the driver command torque and the desired torque of the drive slip control which, in this embodiment, exhibits a minimum value. Thereafter, in one step, the command torque is determined from the maximum value of the desired torque of the engine drag torque controller and the resulting torque (as a rule, of the drive slip controller). In this way, during an increase of the road speed, the desired torque of the engine drag torque controller becomes effective and, with a vanishing of the speed deviation, when the desired torque of the engine drag controller is 0, the desired torque of the drive slip controller becomes effective. For this reason, a road speed control is achieved also with such a procedure in correspondence to the above described.

In a third embodiment, the output quantity of one of the controls is not set to an extreme value as described above; instead, both controls are combined with each other. For example, when there is a drop below the desired speed by the actual speed in one embodiment, this is interpreted as input slip of the engine drag torque controller which then increases the engine torque. If the actual speed exceeds the desired speed, then this is interpreted as the input quantity of the drive slip controller which then again reduces the engine torque. In this way, the above described road speed control function can also be realized.

In a fourth embodiment, and for an active road speed controller, a specific quantity is determined as substitute value for the driver command torque. The realization of the road speed controller then takes place with the aid of the drive slip controller and the engine drag torque controller in accordance with one of the above-described embodiments.

The above-described procedure of the coordination of driver command and drive slip controller and, if necessary, engine drag torque controller, is utilized in the realization of a road speed limiter (FGB) by means of the drive slip controller.

As in a conventional road speed limiter, the driver has at least one operator-controlled element with the aid of which the limiter is activated. For the activation of the limiter, the limiting value VLIM, which is pregiven by the driver, is read in and can be changed during operation by actuating the operator-controlled element. Furthermore, the actual speed VACT is detected either by means of a separate road speed transducer or is detected on the basis of selected wheel speeds. If the limiter is activated, then the one deviation between the limit speed and the actual speed is supplied as slippage to the drive slip controller, which is located in the road speed control mode. The one deviation results when the limit value VLIM is exceeded by the speed VACT. The drive speed controller reduces the drive torque because of the slip applied thereto until the slip is reduced. If the actual speed drops below the desired value, the torque desired value of the drive slip controller is again set to its neutral value (infinity) so that the driver command again assumes the adjustment of the engine torque. In this way, the speed can be limited to the desired value.

This solution for limiting the road speed is shown in FIG. 3 as a flow diagram and is with respect to a preferred embodiment. The flow diagram outlines the program of the computer of the control unit.

The program shown is started when the driver activates the limiter by actuating the operator-controlled element. In this case, the program is run through at pregiven time intervals. After activation, the road speed limit value VLIM is read in in the first step 202. Thereafter, in step 206, the actual road speed VACT is read in as well as the driver command (driver command torque MFA) formed in another program on the basis of the accelerator pedal position. Thereafter, in step 208, the pseudo slip value SP is determined as a difference from the actual speed VACT and the desired speed VDES. Thereafter, in step 210, the desired torque MDESASR is read in which is formed by the drive slip controller on the basis of the pseudo slip SP. As described above, this desired torque value is successively reduced by the drive slip controller as long as a positive slip is present. If this positive slip vanishes, or if this positive slip becomes negative, then the desired torque value MDESASR is successively increased until the maximum value is reached. Thereafter, in step 214, the command torque MCOMMAND is formed from the minimum value selection of the driver command torque MFA and the desired torque MDESASR. In the next step 216, the resulting command torque MCOMMAND is applied for forming at least one actuating quantity of the drive unit, for example, the throttle flap position, fuel mass, ignition angle, drive current, et cetera. In the next step 218, a check is made as to whether the road speed limiter is deactivated. If this is not the case, then the program is repeated with step 202 and, for a deactivated road speed controller, the program is ended.

In lieu of the above-described inputs of torques as desired quantities, other output quantities of the drive unit, for example, power values are pregiven in other embodiments.

Depending upon the embodiment, either the limiter or the controller or both are utilized. In the last case, the following relationships result from the interaction of the drive slip controller and the engine drag torque controller.

| Engine drag torque controller | Drive slip controller | Effect |
| --- | --- | --- |
| Normal function without manipulation | Normal function without manipulation | Normal driving operation |
| Normal function without manipulation | Operation in the FGR/FGB mode: positive speed deviation as pseudo slip | Road speed limiter |
| Operation in FGR mode: maximum torque | Normal function without manipulation | Maximum acceleration (for example, resumption of a desired speed) |
| Operation in the FGR mode: maximum torque | Operation in the FGR/FGB mode: positive speed deviation as pseudo slip | Road speed controller |

It is understood that the foregoing description is that of the preferred embodiments of the invention and that various changes and modifications may be made thereto without departing from the spirit and scope of the invention as defined in the appended claims.

What is claimed is:

1. A method for controlling the speed of a vehicle having a drive unit, the method comprising the steps of:

pregiving a desired speed of said vehicle;

determining the actual speed of said vehicle;

providing a drive slip controller and an engine drag torque controller which generate at least one control quantity for controlling an output quantity of said drive unit in dependence upon the wheel behavior of at least one drive wheel;

determining the deviation between said desired and actual speeds; and, for controlling the road speed, forming said one control quantity in dependence upon said deviation.

2. The method of claim 1, wherein the control quantity of said engine drag torque controller assumes a pregiven value for active road speed control.

3. The method of claim 1, wherein said pregiven value is a maximum value.

4. The method of claim 1, wherein, for active road speed control, said deviation is interpreted as the wheel slip for said drive slip controller; and, said drive slip controller then determines a reducing control quantity when said actual speed exceeds said desired speed.

5. The method of claim 1, wherein the control quantity of said drive slip controller is set to a pregiven value when the road speed control is active.

6. The method of claim 5, wherein said pregiven value is equal to or close to zero.

7. The method of claim 1, wherein said deviation is used as an input quantity of said engine drag torque controller, which increases the control quantity and therefore the output quantity of said drive unit when the actual speed drops below said desired speed.

8. The method of claim 1, wherein said deviation is supplied to both of said controllers, which change their control quantities in correspondence to their function; and, wherein said engine drag torque controller increases the control quantity when said actual speed drops below said desired speed and said drive slip controller reduces the control quantity thereof when said actual speed is greater than said desired speed.

9. The method of claim 1, wherein the output quantity of said drive unit is controlled in accordance with the smaller control quantity when the output quantity of said engine drag torque controller assumes a specific value and in accordance with the larger control quantity when the control quantity of said drive slip controller assumes a pregiven value.

10. A method for controlling the speed of a vehicle having a drive unit, the method comprising the steps of:

pregiving a limit speed;

determining the actual speed of said vehicle;

providing a drive slip controller for generating at least one control quantity for controlling an output quantity of said drive unit in dependence upon the wheel behavior of at least one drive wheel;

determining the deviation between said limit speed and said actual speed; and, for limiting the road speed, forming at least one control quantity of said drive slip controller in dependence upon said deviation.

11. An arrangement for controlling the speed of a vehicle, the arrangement comprising:

a control unit for detecting the actual speed of said vehicle and for outputting a desired speed of said vehicle;

an engine drag torque controller for generating a control quantity in dependence upon the behavior of at least one drive wheel;

a drive slip controller for generating at least one control quantity in dependence upon the behavior of at least one drive wheel;

means for forming the deviation between said actual and desired speeds of said vehicle; and, at least one of said controllers being so configured that said one controller changes the control quantity thereof in dependence upon said deviation between said desired and actual speeds.

12. An arrangement for controlling the speed of a vehicle having a drive unit, the arrangement comprising:

a control unit for detecting the actual speed and for inputting a limit speed;

a drive slip controller for generating a control quantity in dependence upon the behavior of at least one drive wheel;

means for forming the deviation between said limit speed and said actual speed; and, said drive slip controller being so configured that said drive slip controller changes the control quantity thereof in dependence upon said deviation in the active drive speed limit operation.

* * * * *